Figure 1:
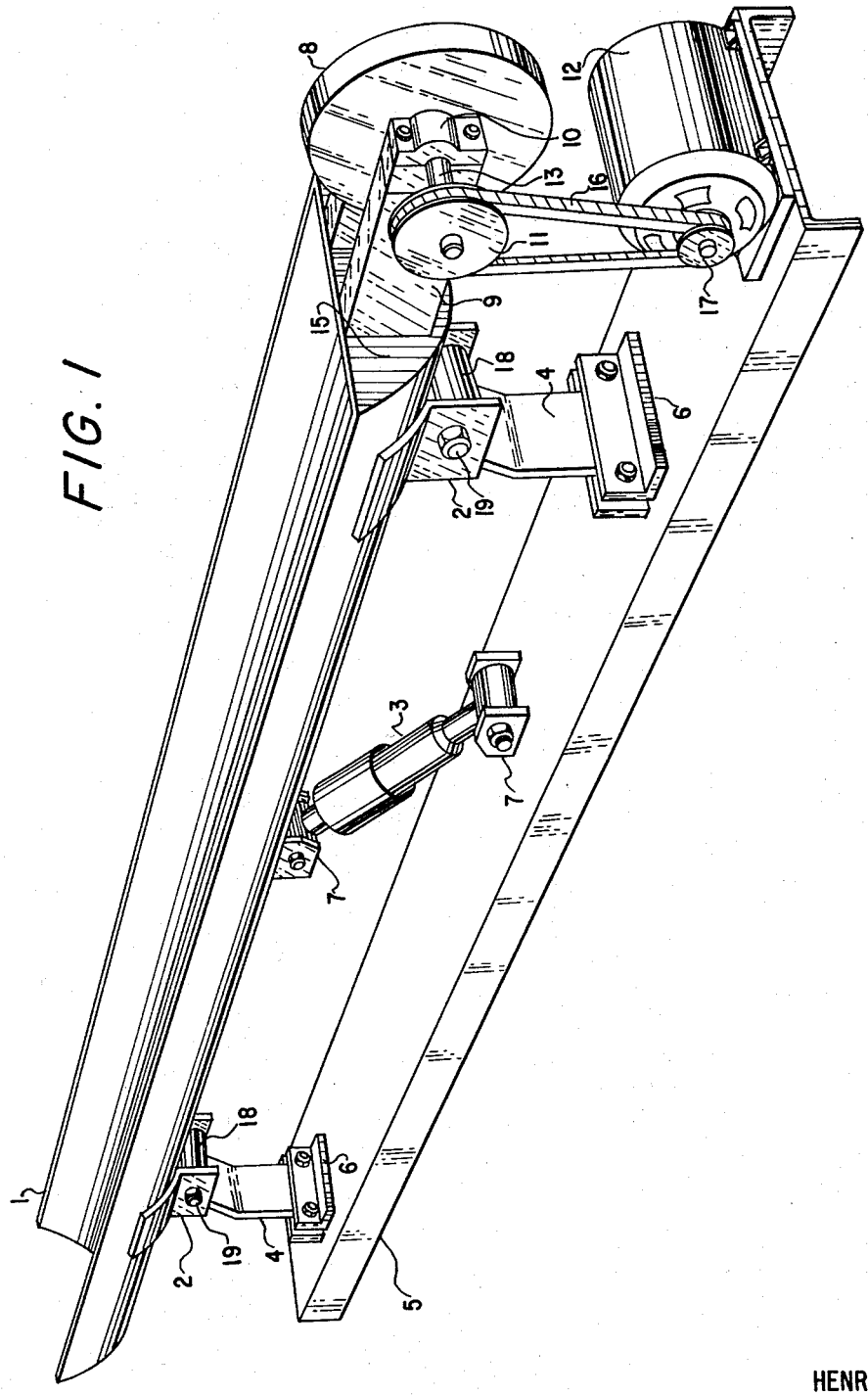

Dec. 20, 1966    H. J. KORAB    3,292,774
MATERIALS HANDLING DEVICE
Filed Oct. 5, 1964    3 Sheets-Sheet 1

INVENTOR
HENRY J. KORAB by Walter S. Pawl
ATTORNEY

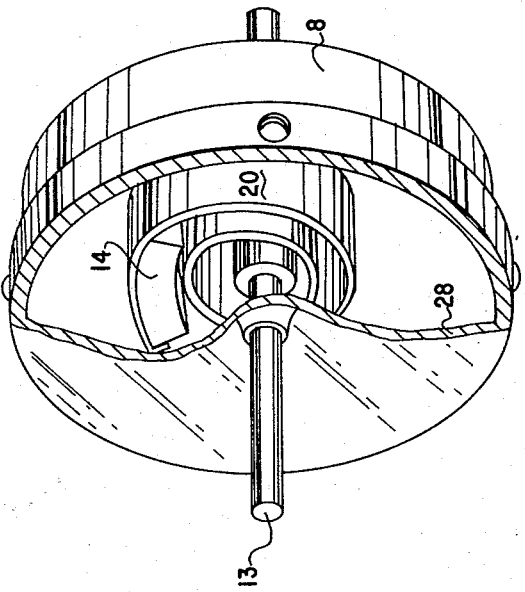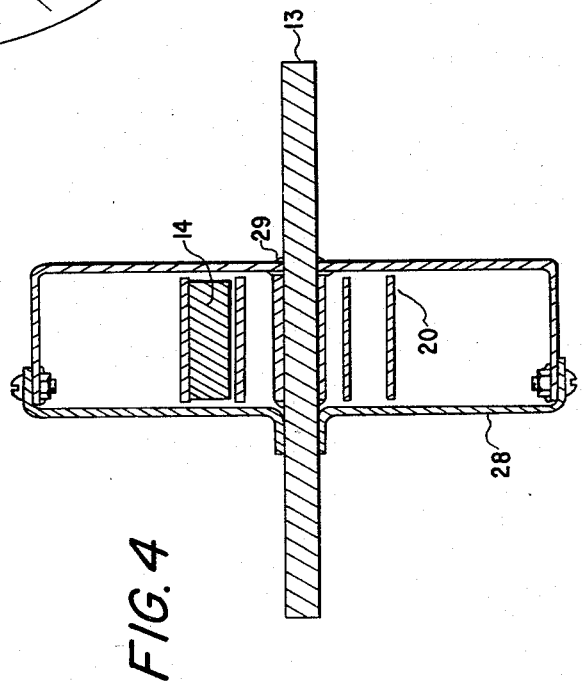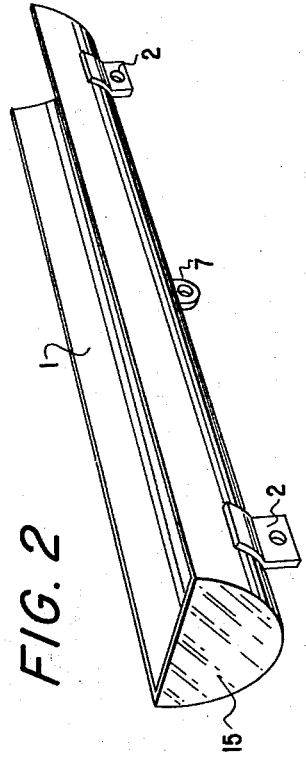

Dec. 20, 1966 H. J. KORAB 3,292,774
MATERIALS HANDLING DEVICE
Filed Oct. 5, 1964 3 Sheets-Sheet 3
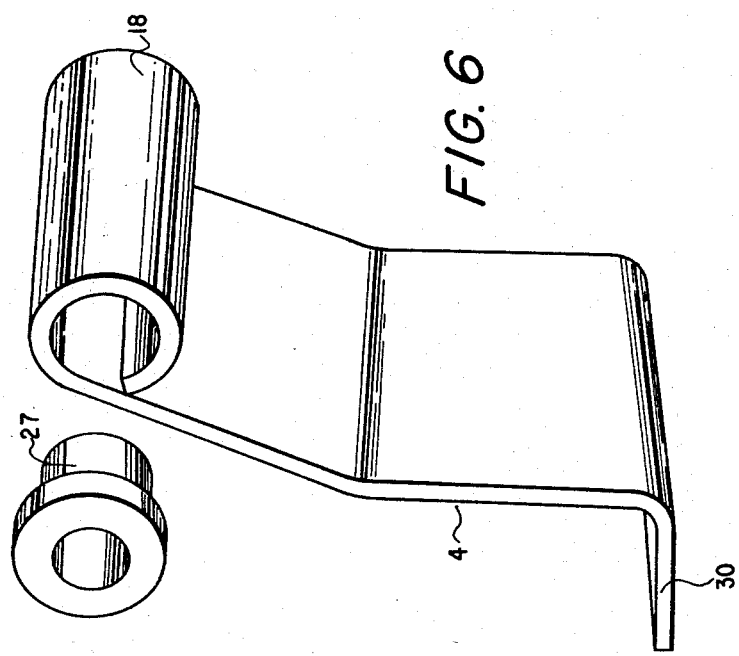
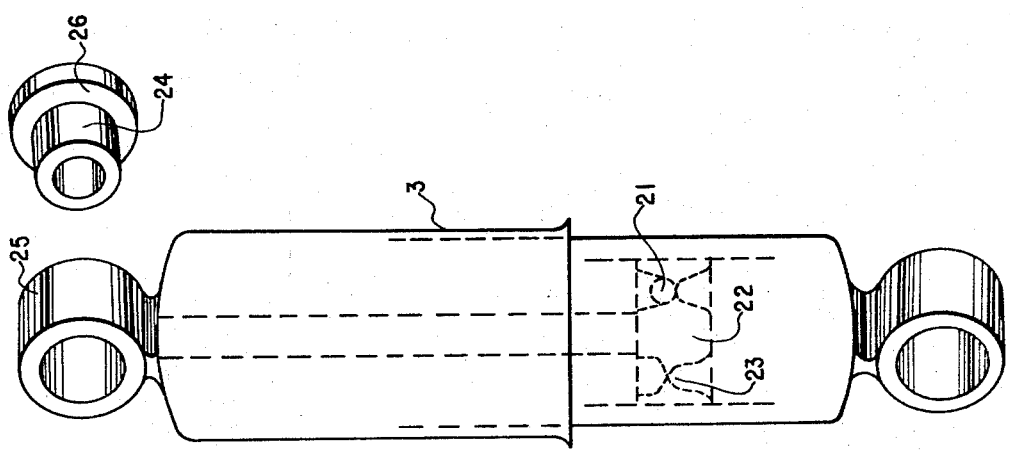
INVENTOR
HENRY J. KORAB
by Walter S. Paul
ATTORNEY United States Patent Office 3,292,774
Patented Dec. 20, 1966

3,292,774
MATERIALS HANDLING DEVICE
Henry J. Korab, 1600 Dual Highway,
Hagerstown, Md. 21740
Filed Oct. 5, 1964, Ser. No. 401,608
4 Claims. (Cl. 198—220)

My invention relates to an improved apparatus and method whereby materials can be conveyed, screened and processed, or handled by performing any combination of the above functions.

One of the objects of my invention is to develop a simple, rugged, and reliable form of materials handling device which utilizes a minimum of power and requires a minimum of maintenance.

Another object of my invention is to provide a construction of a materials handling device employing a load receiving and conveying trough, supported beneath and restricted in lateral movement in such a manner that the resultant movement of the trough serves to impart a directed lineal movement to material within.

Another object of my invention is to provide simplified construction of the trough which will greatly facilitate manufacture and at the same time be more durable and more efficient from a "weight to volume" standpoint.

Another object of my invention is to provide a system of improved suspension for the trough by which the trough movement is controlled, such that an oscillating motion only occurs within a small arc formed in a plane through the longitudinal axis of the aforementioned trough.

Another important object of my invention is to provide a novel and unique method which will control the speed with which said trough moves through the oscillations in the opposite directions in the aforementioned arc of movement.

Another object is to provide an improved means of generating and transmitting, at minimum power expense, the required gyratory forces necessary for the reactant trough movements.

Other and more specific objects of my invention will be set forth more fully in the following specifications and accompanying drawings, wherein:

FIGURE 1 is a perspective view of the materials handling device of my invention, FIG. 2 is a perspective view of the trough element, FIG. 3 is a perspective view of the eccentrically mounted weight element, with the casing partly broken away to show the spiral spring by which the eccentric weight is mounted on the shaft, FIG. 4 is an axial sectional view through this eccentrically mounted weight element, FIG. 5 is an enlarged detail perspective view of the shock absorber element and one of the eye bushings, and FIG. 6 is a perspective enlarged detail view of one of the trough mounting support brackets.

My invention is directed to a novel construction of a materials handling apparatus and is illustrated in the drawings, which show a preferred form of such apparatus. It may be used for conveying screening, washing, drying, feeding, agitating, or for any combination of these processes.

After extended research and experimentation, I have discovered this new and improved apparatus and method by which materials having particles of a great variety of shapes, sizes, and physical properties, can be moved and/or processed between two stations in a more or less level path of movement of the materials.

In this improved apparatus or device, the material containing trough 1 is mounted upon resiliently flexible steel supports 4 which are attached to the trough by means of pin bearing 18 between support brackets 2, in which the shackle bolts 19 are mounted. The supports 4 have a base frame 5 to which they are rigidly fixed by support positioning and clamping brackets 6.

A shock absorber 3 is mounted by pivotal bearing brackets 7 between the bottom of the trough 1 and the base frame 5.

A speed responsive eccentric weight 14 resiliently connected by a spiral spring 20 to a drive shaft 13 and enclosed by a protective casing 8 is mounted in bearings 10 on bearing supports 9 extending from the closed end 15 of the trough. The drive shaft has a pulley 11 connected by a belt 16 to a pulley 17 on the shaft of a motor 12, providing a flexible drive for the eccentric weight without restricting the oscillations of the trough caused by operation of the eccentric weight.

The enlarged view of the shock absorber 3 in FIG. 5 indicates a check valve 21 with a large flow capacity through the piston 22 to provide minimum resistance to inward movement of the piston in the shock absorber, and a restricted flow capacity opening 23 for damping outward movement of the piston.

The spring supports 4 are normally inclined in the direction of the closed end of the trough, so that the oscillations of the trough are substantially in an arc that lowers the trough as it oscillates in the direction of said inclination and raises it as it oscillates in the opposite direction, the latter oscillations being damped by the shock absorber and the former being substantially unrestricted. Thus, the material in the trough is subjected to relatively quicker withdrawing impulses of the trough during its oscillation in the one direction and slower and rising impulses in the opposite direction, which tend to move the material intermittently toward the open end of the trough, as it is illustrated in the drawing.

Bushings 24 of wear resistant material such as rubber or nylon may be provided for the eyelet bearings 25 of the shock absorber 3, with flanges 26 to extend between the opposite ends of the eyelet bearings 25 and the brackets 7. Similar bushings 27 may be provided between the bearings 18 and brackets 2, for quiet and efficient performance.

In addition to its simplicity, the device illustrated possess the following advantages over prior art devices: the trough is shaped to promote sanitary and complete decontamination when used to handle foods, drugs, abrasive substances, or radioactive chemicals; in addition, the contour of the trough lends itself to lining with ceramics, plastics, elastomers or other such substances; its semi-cylindrical shape also eliminates any objectionable noises due to synchronous vibrations of the trough side walls or floor; the design of the trough also provides a more rigid, fatigue resistant material holding structure which is geometrically approximately 13% lighter for a given capacity and produces 13% less surface contact of the pan with its contents than in rectangularly shaped pans; furthermore, the present design causes conveyed materials to automatically assume a position at the longitudinal center of the trough thereby tending to put in balance the sum of the longitudinal axial torques; and also, we have the metametric nature of the trough which greatly facilitates engineering required when constructing materials handling devices of different lengths.

The eccentric weight protective casing 8 has a cover 28 for easy removal and access to the weight when inspecting its condition or attachment to the drive shaft, or when it is necessary to change the torque required by changing the weight 14 or the spiral spring 20, or both. The casing 8 may be fixed to the drive shaft 13 by welding at 29.

The trough support 4 may be fabricated of special spring steel shot peened on its leading surface as an aid in producing differential recoil motions. The eye bearing 18 formed at its upper end is so designed as to accommodate a maintenance free, wear resistant, vibration isolating, rubber bushed shackle bolt 19. Approximately one-third of the length of this structure may be perpendicular to the base, while the upper two-thirds is inclined about 15 degrees toward the rear of the device. The position of this bend is important in that it allows the weight of the pan to assist in promoting additional energy used ultimately in the conveying stroke of the trough. At the base of the support structure there is formed a foot 30, which serves not only as a supporting surface, but in conjunction with the unique clamp, it also serves to limit upward and lateral movements of the support. This design of support therefore provides accommodations for handling all classes of materials having different physical properties. Different materials would merely require support structures made from steel of different dimensions.

The bushings used in the support bearings may be of rubber close-fitted so as to exhibit no wear producing external friction. They may be sized in relation to the amount, density, size, shape, and other physical properties of the materials to be handled. Machine capacity changes are made merely by making the support members from steel of different thicknesses and/or width. The conveying action is therefore a result of the amount of energy retained by and transferred from these members.

Generation of this storable energy is accomplished through the use of a number of essential elements of novel construction in the present invention. Tracing the propagation of the oscillatory motion, we may start with that portion of the trough upon which the drive is mounted. Here are two heavy duty pillow block type bearings holding the steel drive shaft. Upon this shaft is affixed the centrifugally sensitive mass, which upon rotation of the shaft, assumes an eccentricity with relation to the shaft depending on the speed and acceleration of rotation. This weight is made of a very dense material in order to conserve space. The centrifugal force, which controls the orbit of this weight, is developed in a spirally wound leaf spring connecting it to the drive shaft. For protection, a steel shroud or casing encloses this mechanism.

Production of the conveying motion is a most important feature of this invention, in which I have taken advantage of the inertia of the substance being handled to keep the substance in motion after once being started. In various contemporary devices, energies are used to hop or push the material forward and upward against gravity utilizing pan friction, while in the present device, the inertia of the material is responsible for maintaining substantially continuous movement derived from the energy of reciprocating frictional impulses at different speed in the opposite directions to move the material in the direction of the lower speed impulses, while energy stored in the spring supports is quickly released to aid in slipping the trough out from under the material during the higher speed impulses in the other direction. (Gravity, in fact, aids this backward and downward motion of the trough.) At the end of this slipping back cycle, gravity has caused the material within the trough to again acquire good frictional contact with the trough. Next, the slower moving forward cycle of the trough continues to keep the material within motion in the forward direction. These fast and slow motions of the trough are a result of the differential action of the speed control shock absorber element, which is linked between the moving trough and the base at an angle of about 45 degrees. Thus, the loaded trough moves forwardly and upwardly at a slow rate, and then the trough suddenly reverses direction and moves downwardly and backwardly at a relatively rapid rate, leaving the material instantly suspended in "mid air," so to speak, its inertia tending to continue its forward motion, while the trough "catches" it again and adds another forward impulse to it to restore its inertia in its forward motion. This motion occurring many times per minute, results in the substantially horizontal and continuous unidirectional movement of the material in the trough with a minimum of wasted motion and energy consumption.

Many obvious modifications in the arrangement and details of the several elements may be made without departing from the spirit and scope of the invention as defined in the appended claims.

What is claimed is:
1. A materials handling device comprising
a trough mounted on flexible spring support strips for axially oscillating movement at differential speeds in the opposite directions,
a motor-driven eccentric weight rotatably mounted on a horizontal axis at one end of said trough perpendicular to its axis and
a shock absorber having a chamber and piston with a check valve controlled large passage in its head, said shock absorber being attached at one end to said trough for damping the oscillations in one direction of said oscillating movement when said check valve is closed and providing little resistance to said movement in the other direction when said check valve is opened,
said flexible support strips having a base to which the other end of said shock absorber is attached,
a motor mounted at one end of said base below said eccentric weight for driving it,
said eccentric weight having a drive shaft and a resilient member attaching it to the shaft and providing a bias on the weight toward the shaft to a normally small eccentricity when the shaft is stationary, the eccentricity being increased upon rotation of the shaft in accordance with the speed of rotation, and
a casing mounted on said shaft forming a protective enclosure in which the weight moves to different eccentricities, and
said resilient member is a spiral coil spring around said shaft mounted so as to decrease the eccentricity upon acceleration of the shaft, as in starting, to make starting easier.
2. A materials handling device as defined in claim 1, said coil spring normally having radially spaced convolutions,
said shaft being driven in a direction to tighten the coil spring on the shaft to provide said decrease in eccentricity of the weight upon acceleration of said shaft.
3. A materials handling device as defined in claim 1, said trough having a closed end,
a pair of bearing brackets extending from said closed end, having bearings for said shaft on opposite sides of said casing,
said shaft and said motor having aligned pulleys, and
a belt over said pulleys to provide a flexible drive therebetween without restricting the oscillations of the trough and said shaft.
4. A materials handling device as defined in claim 1, said supports being normally inclined toward said motor end of said base, and
said shock absorber extending from a pivotal connection at the bottom of said trough in the same direction to a pivotal connection at the base, and providing little resistance to the oscillations in this direction while damping them in the opposite direction, whereby the trough will convey materials in said opposite direction in intermittent impulses of varying magnitudes depending on the mass of the materials in the trough and the speed of operation of said drive shaft.

(References on following page)

References Cited by the Examiner

UNITED STATES PATENTS

| | | | |
|---|---|---|---|
| 481,106 | 8/1892 | Coxe | 198—220 |
| 1,160,427 | 11/1915 | Marcus | 198—220 |
| 2,325,248 | 7/1943 | Johnstone | 198—220 |
| 2,705,070 | 3/1955 | Carrier et al. | 198—220 X |
| 2,861,458 | 11/1958 | Awedissjan | 74—87 |
| 2,947,181 | 8/1960 | Carrier et al. | 198—220 |

FOREIGN PATENTS

| | | |
|---|---|---|
| 924,396 | 3/1947 | France. |
| 433,960 | 9/1926 | Germany. |
| 396,033 | 8/1933 | Great Britain. |
| 45,426 | 10/1908 | Switzerland. |

EVON C. BLUNK, *Primary Examiner.*

R. WALKER, M. L. AJEMAN, *Assistant Examiners.*